(No Model.) 2 Sheets—Sheet 1.
F. X. ECKSTEIN.
SPLIT PULLEY.
No. 586,119. Patented July 13, 1897.
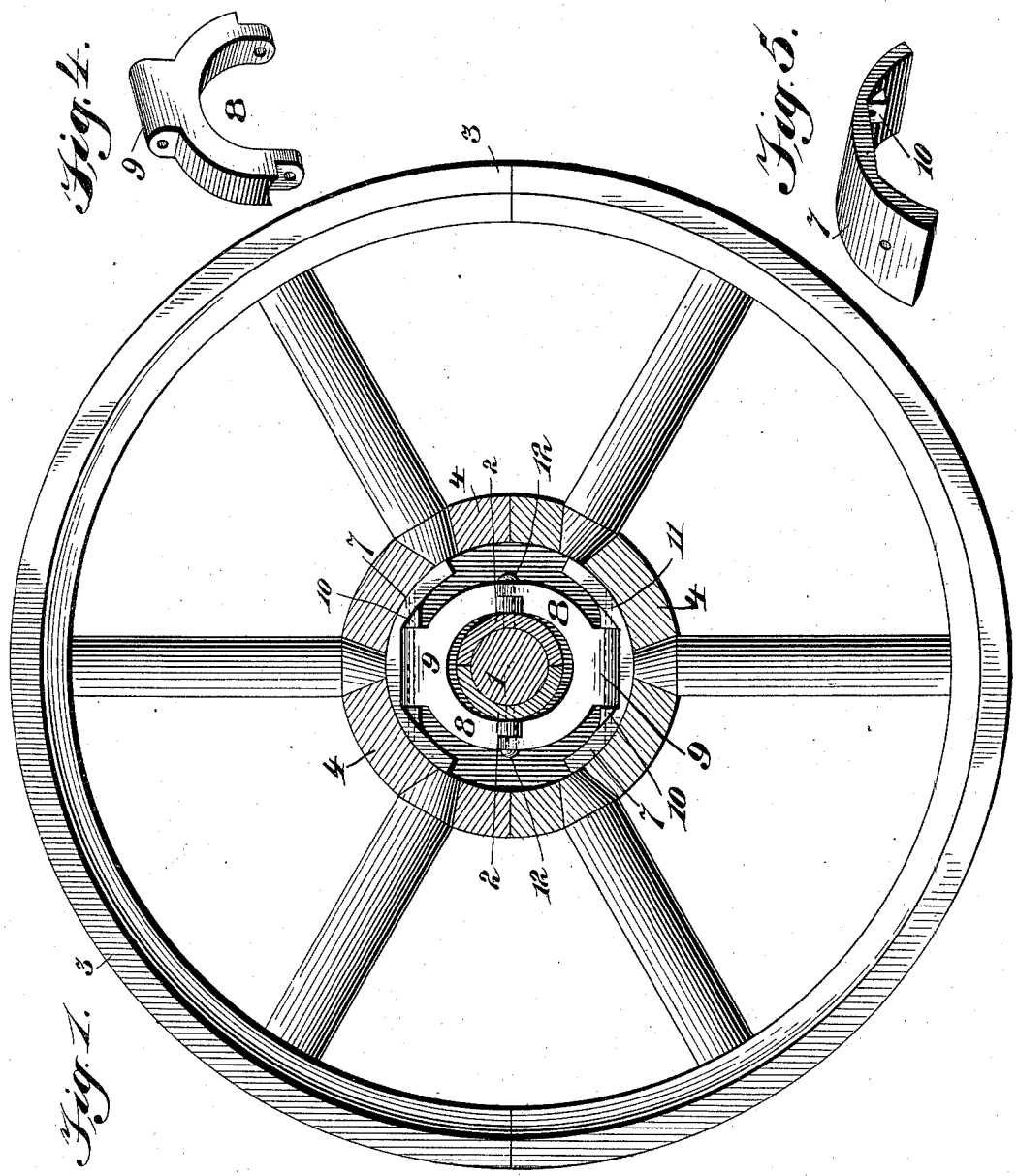
Witnesses
H. G. Dieterich
V. B. Hillyard
Inventor
Francis X. Eckstein
By his Attorneys.
C. A. Snow & Co.

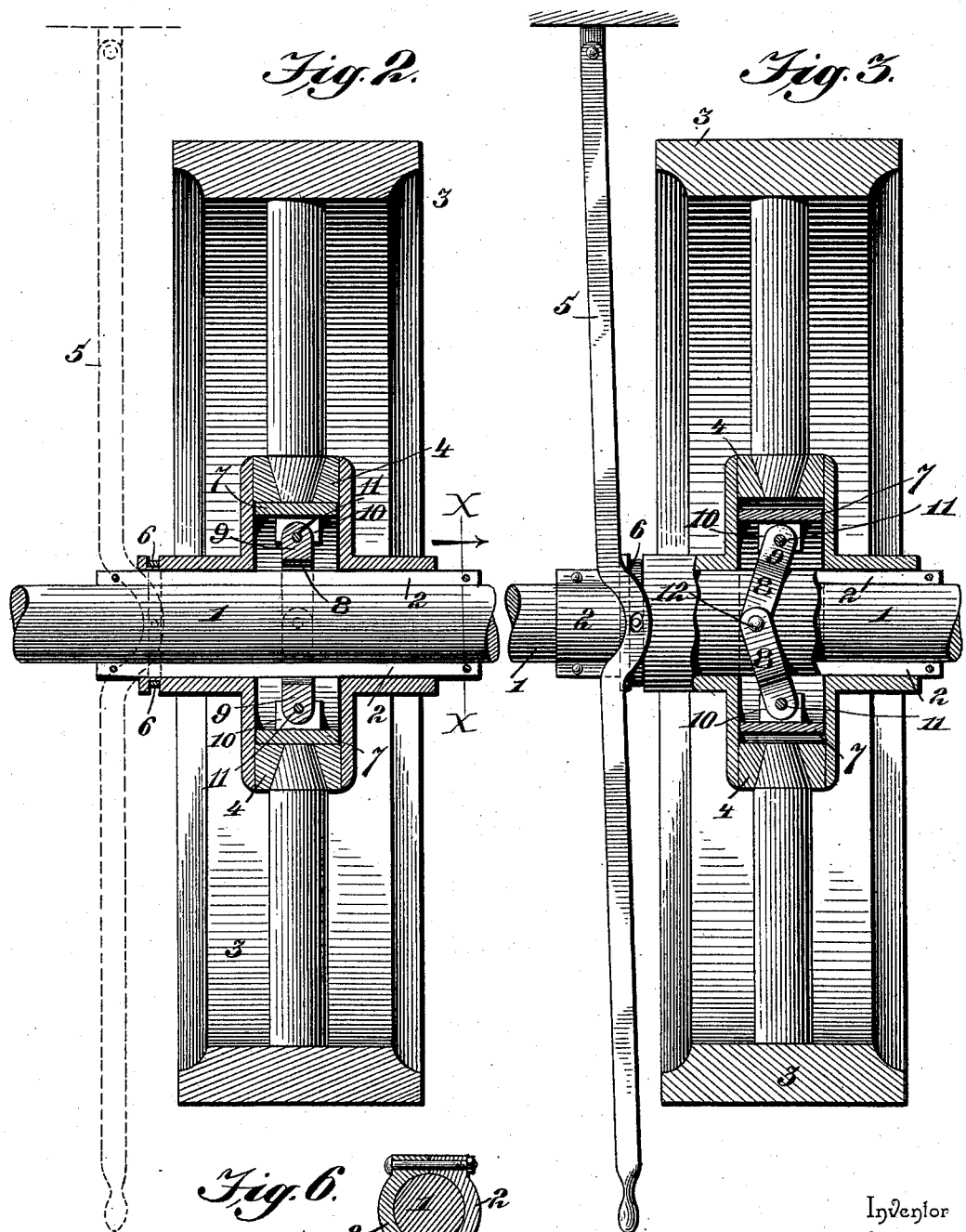

UNITED STATES PATENT OFFICE.

FRANCIS XAVIER ECKSTEIN, OF STURGIS, MICHIGAN.

SPLIT PULLEY.

SPECIFICATION forming part of Letters Patent No. 586,119, dated July 13, 1897.

Application filed March 17, 1897. Serial No. 628,029. (No model.)

*To all whom it may concern:*

Be it known that I, FRANCIS XAVIER ECKSTEIN, a citizen of the United States, residing at Sturgis, in the county of St. Joseph and State of Michigan, have invented a new and useful Split Pulley, of which the following is a specification.

This invention aims to reduce the wear and tear of belts, counter-shafting, and the parts coöperating therewith in power-transmitting systems in which line-shafting is driven in any of the usual ways and from which power is taken for imparting motion to the machinery to be actuated.

By this invention a pulley is provided which can readily be applied to line-shafting, being separable for this purpose, and which is capable of being clutched to or released from the line-shafting, thereby permitting the latter to revolve without imparting any movement to the pulley, thereby attaining the desired ends.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof; and to a full disclosure of the invention an adaptation thereof is shown in the accompanying drawings, in which—

Figure 1 is a side elevation of a line-shafting pulley, showing the peripheral portion of the hub, the bushing, and the shafting in section. Fig. 2 is a transverse section of the pulley and its mountings, showing the line-shafting in full lines and indicating the relative disposition of the parts when the pulley is clutched so as to revolve with its supporting-shafting. Fig. 3 is a view similar to Fig. 2, showing the relation of the parts when the pulley is released. Fig. 4 is a detail view of a toggle-lever. Fig. 5 is a detail view of a gripping-block. Fig. 6 is a detail section on the line X X of Fig. 2, looking in the direction of the arrow.

Corresponding and like parts are referred to in the following description and indicated in the several views of the accompanying drawings by the same reference-characters.

The line-shafting is designated by the numeral 1, upon which is secured a sleeve or bushing 2 in any convenient way, said bushing being formed of equal parts, which are bolted together and clamped around the said shafting. The pulley 3, having a chambered hub 4, is mounted upon the bushing 2 so as to slide and turn freely thereon, being controlled in its sliding movements by a shipper-lever 5, connected to a ring 6, fitted in a groove at one end of the hub 4. This pulley is separable, so as to be fitted upon the line-shafting in the ordinary manner.

Gripping-blocks 7 of segmental form are located within the chamber formed in the hub 4 and are placed at diametrically opposite points, and similarly-formed toggle-levers 8 have pivotal connection at their outer ends with the gripping-blocks and at their inner ends with each other and with the bushing 2. The toggle-levers are of approximately semicircular outline, so as to span the line-shafting and bushing and distribute the strain equally upon opposite sides thereof. Bearings 9 are formed at the outer ends of the toggle-levers and snugly fit between shoulders 10, formed on the inner faces of the gripping-blocks, and pins 11 pass through corresponding openings in the bearings 9 and shoulders 10 and serve to pivotally connect the gripping-blocks and toggle-levers.

The opposing ends of the toggle-levers are halved to secure a snug joint, and the pins 12, which pivotally connect them, enter the bushing 2, so as to prevent any movement of the toggle-levers other than a turning thereof upon the said pins or pivots, whereby when the pins 11 are moved toward a straight line or plane passing through the pins 11 and 12 the toggle-levers will straighten and cause the gripping-blocks to bear forcibly against the inner face of the chambered hub and cause the pulley and line-shafting to rotate together.

Upon moving the pulley 3 upon the bushing in one direction the toggle-levers will be operated so as to withdraw the gripping-blocks from engagement with the inner face of the chambered hub, and by moving the pulley in an opposite direction the toggle-levers will be straightened and the gripping-blocks brought into engagement with the inner face of the chambered hub and cause the pulley to rotate with the line-shafting, the pulley being moved in each direction by the shipper-lever 5. The gripping-blocks operate within the chambered hub and their sides touch the inner walls of the chamber, thereby causing a turning of the toggle-levers upon their pivots 12 when moving the pulley upon its support.

Having thus described the invention, what is claimed as new is—

1. In combination, a pulley, a support therefor adapted to be secured to the line-shafting to rotate therewith, levers pivoted at their inner ends to the support, gripping-blocks attached to the outer ends of the pivoted levers, and means for moving the pulley upon its support to cause the gripping-blocks to engage with and cause the pulley to rotate with its support, substantially as set forth.

2. In combination, a support adapted to be secured to the line-shafting to rotate therewith, a pulley having a chambered hub and slidably and rotatably mounted upon the said support, levers pivoted at their inner ends to the support, gripping-blocks having connection with the outer ends of the levers and operating in the said chambered hub, and means for sliding the pulley upon its support, substantially as and for the purpose set forth.

3. In combination, a support adapted to be secured to the line-shafting to rotate therewith, a pulley rotatably and slidably mounted upon the support, toggle-levers pivotally connected at their inner ends to each other and to the support, gripping-blocks having pivotal connection with the outer ends of the toggle-levers, and means for positively moving the pulley upon its support in each direction, substantially as and for the purpose described.

4. In combination, a support adapted to be secured to the line-shafting to rotate therewith, a pulley rotatably and slidably mounted upon the support, toggle-levers spanning the support and having pivotal connection therewith at opposite sides, gripping-blocks applied to the outer ends of the toggle-levers, and means for positively moving the pulley upon its support in opposite directions, substantially as set forth.

5. In combination, a bushing or sleeve forming a support and adapted to be secured to a line-shafting, a pulley rotatably and slidably mounted upon the support and having a chambered hub, gripping-blocks located within the chambered hub, toggle-levers of approximately semicircular form spanning the support and having pivotal connection therewith at opposite sides, and having pivotal connection at their outer ends with the gripping-blocks, and means for positively moving the pulley upon its support in each direction, substantially in the manner set forth for the purpose described.

In testimony that I claim the foregoing as my own I have hereto affixed my signature in the presence of two witnesses.

FRANCIS XAVIER ECKSTEIN.

Witnesses:
CHARLES GOETTING,
HERMAN RAST.